United States Patent [19]  [11] Patent Number: 4,986,082
Tomaru  [45] Date of Patent: Jan. 22, 1991

[54] REFRIGERANT CHARGING SYSTEM IN WHICH A REFRIGERANT IS FRESHENED AND SMOOTHLY CHARGED INTO A STORAGE CONTAINER

[75] Inventor: Keiichi Tomaru, Fujioka, Japan
[73] Assignee: Sanden Corporation, Gunma, Japan
[21] Appl. No.: 454,639
[22] Filed: Dec. 21, 1989
[30] Foreign Application Priority Data
Dec. 22, 1988 [JP] Japan ................. 63-322161
Dec. 22, 1988 [JP] Japan ................. 63-322163
[51] Int. Cl.⁵ .......................... F25B 43/00; F25B 45/00
[52] U.S. Cl. ........................... 62/149; 62/195; 62/509; 62/513
[58] Field of Search ............ 62/149, 174, 292, 77, 62/85, 195, 474, 475, 513, 113, 117, 509, 512

[56] References Cited
U.S. PATENT DOCUMENTS 2,986,894 6/1961 Endress et al. ............ 62/85
3,037,362 6/1962 Tilney et al. ............. 62/117
3,564,865 2/1971 Spencer et al. ........... 62/197
4,441,330 4/1984 Lower et al. ............. 62/149
4,476,688 10/1984 Goddard ................ 62/292 X
4,633,674 1/1987 Sato ..................... 62/197
4,809,515 3/1989 Houwink ................ 62/149
4,903,499 2/1990 Merritt .................. 62/292 X Primary Examiner—Harry B. Tanner
Attorney, Agent, or Firm—Banner, Birch, McKie & Beckett

[57] ABSTRACT

For carrying out charging of a refrigerant into a storage container (26), the refrigerant is separated into gaseous and liquid phase refrigerant segments which are supplied to a receiving unit (22) and an evaporator (18), respectively. The receiving unit and the evaporator are thermally coupled to each other. The gaseous phase refrigerant segment is modified into a modified refrigerant in a liquid phase in the receiving unit by use of evaporation of the liquid phase refrigerant segment in the evaporator. The modified refrigerant is sent from the receiving unit to the storage container. For smoothly carrying out reception of the modified refrigerant in the storage container, the inner pressure of storage container is controlled by a controlling arrangement (31, 32, 33, 34).

10 Claims, 2 Drawing Sheets

REFRIGERANT CHARGING SYSTEM IN WHICH A REFRIGERANT IS FRESHENED AND SMOOTHLY CHARGED INTO A STORAGE CONTAINER

BACKGROUND OF THE INVENTION

This invention relates to a refrigerant charging system which is for use in charging a refrigerant into a storage container. More particularly, this invention relates to a system which is of the type described and operable in a self-heat exchanging system.

A refrigerant, such as a fluorocarbon refrigerant, is commonly employed in an air conditioner of an automobile or a refrigerator.

A refrigeration system will operate more efficiently when the refrigerant is pure and relatively free of pollutants, such as oil, air and water. But, a used refrigerant becomes impure by pollutants.

Therefore, it is necessary to periodically remove and recharge the refrigerant within the refrigerant system.

Various refrigerant charging systems are already known. In the Miyata et al article, a citation is made to a refrigerant charging system of the type disclosed in Japanese Patent Prepublication (Kookai) No. 251767 of 1988.

In a manner which will later be described in connection with this invention, such a refrigerant charging system comprises a receiving unit which receives an object refrigerant to make a modified refrigerant in a liquid phase, through the use of an evaporator included in an external freezing or refrigeration circuit. The external freezing circuit is operated to cause evaporation of another refrigerant in the evaporator. The object refrigerant is produced from an original refrigerant which is employed in, for example, an air conditioning system. The modified refrigerant is dropped from the receiving unit into a storage container by gravitational force, to thereby charge the modified refrigerant to the storage container. However, the inevitable need to use an external freezing circuit causes a problem for modifying the object refrigerant.

In addition, the inner pressure of the storage container becomes high in response to an increase of the modified refrigerant in the storage container. As a result of the high pressure, it is assumed that the modified refrigerant does not charge to the storage container.

SUMMARY OF THE INVENTION

It is therefore an object of the present invention to provide a refrigerant charging system which is for processing an object refrigerant produced from an original refrigerant to be pure and free of pollutants.

It is another object of this invention to provide a system of the type described, in which it is unnecessary to make the object refrigerant pass, repeatedly through filter dryers.

It is still another object of this invention to provide a system of the type described, in which the refrigerant is freshened and smoothly charged into a storage container.

Other objects of this invention will become clear as the description proceeds.

According to this invention, there is provided a refrigerant charging system for usa in charging an object refrigerant, which is produced from an original refrigerant, into a storage container. The refrigerant charging system includes a receiving unit for receiving the object refrigerant, a cooling unit coupled to the receiving unit for cooling the object refrigerant to produce a modified refrigerant through the use of a cooling refrigerant, and a sending unit for sending the modified refrigerant to the storage container as the object refrigerant. The refrigerant charging system comprises a processing unit for a processing the original refrigerant to produce a gaseous phase and a liquid phase refrigerant segments, a first supplying unit coupled to the processing unit and the receiving unit for supplying the gaseous phase refrigerant segment to the receiving unit as the object refrigerant, a second supplying unit coupled to the processing unit and the cooling unit for supplying the liquid phase refrigerant segment to the cooling unit as the cooling refrigerant, and a controlling unit coupled to the storage container for controlling the inner pressure of the storage container to facilitate changing of the modified refrigerant to the storage container.

DESCRIPTION OF THE PREFERRED EMBODIMENTS

Figure 1:
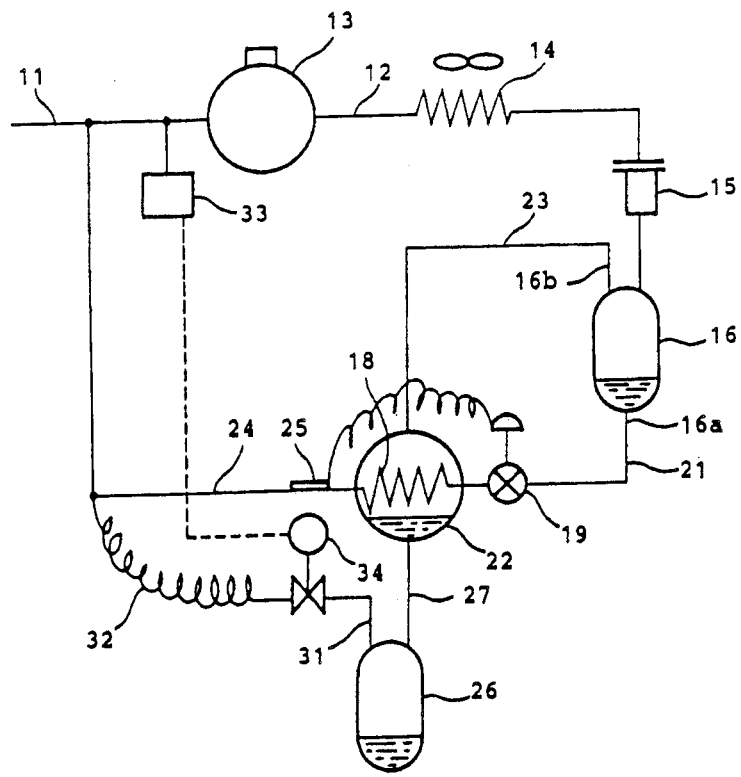
FIG. 1 is a block diagram of a refrigerant charging system according to a first embodiment of this invention.

Referring to FIG. 1, a refrigerant charging system according to a first embodiment of this invention is for charging an object refrigerant recovered from an original refrigeration circuit (not shown) - which is used in, for example, an air conditioning system for an automobile - into a storage container 26. Generally, the original refrigerant is composed of, for example, fluorocarbon refrigerants. The refrigerant charging system comprises an inlet pipe 11 which recovers the original refrigerant from the original refrigeration circuit in the manner known in the art.

For recovering the original refrigerant, the inlet pipe 11 is connected to the original refrigeration circuit. As a result, the original refrigerant may be supplied to a compressor 13 through the inlet pipe 11. In this event, the original refrigerant is of gaseous phase. The inlet pipe 11 can be disconnected from the original refrigeration circuit. The inlet pipe 11 will be referred to as an introducing arrangement.

The original refrigerant is compressed in the compressor 13, and then supplied as a compressed refrigerant to a condenser 14 which is connected to the compressor 13 by a pipe 12. In the condenser 14, the compressed refrigerant is cooled to thereby be condensed as a condensed refrigerant. The condensed refrigerant is supplied to a filter dryer 15 through a pipe which is similar to the pipe 12. The filter dryer 15 is for removing impurities, moisture, and acid content from the condensed refrigerant in a manner known in the art. After that, the condensed refrigerant is supplied to a vessel 16 through a pipe which is similar to the pipe 12. The condensed refrigerant is separated into liquid and gaseous phase refrigerant compound in the vessel 16. As is well known in the art, the gaseous phase refrigerant component has higher purity than that of the liquid phase refrigerant component. A combination of the compressor 13, the condenser 14, the filter dryer 15, and the vessel 16 is referred to as a processing arrangement.

The vessel 16 has a first outlet port 16a at a bottom portion thereof and a second outlet port 16b at an upper portion thereof. The first outlet port 16a is connected to an evaporator 18 via an automatic expansion valve 19 and a first supplying pipe 21. Therefore, the liquid phase refrigerant component is sent as a cooling refrigerant from the vessel 16 to the evaporator 18 and is evaporated in the evaporator 18 to carry out cooling of a surrounding area of the evaporator 18 in a manner known in the art.

On the other hand, the second outlet port 16b is connected to a receiving unit 22, by a second supplying pipe 23, to communicate with a hollow space defined by the receiving unit 22. Therefore, the gaseous phase refrigerant component is sent as an object refrigerant from the vessel 16 to the receiving unit 22.

The evaporator 18 is thermally coupled to the receiving unit 22. In this embodiment, the evaporator 18 is contained in the receiving unit 22. As a result, the gaseous phase refrigerant component is cooled in the receiving unit 22 by evaporation of the cooling refrigerant, namely, the liquid phase refrigerant component in the evaporator 18. In other words, heat exchange is carried out between the gaseous and liquid phase refrigerant components. Therefore, the evaporator 18 may be referred to as a cooling arrangement.

After being evaporated in the evaporator 18, the cooling refrigerant is returned to the compressor 13 through a returning pipe 24. A temperature detecting unit 25 is thermally coupled to the returning pipe 24. The temperature detecting unit 25 is for detecting the temperature of the cooling refrigerant in the vicinity of the receiving unit 22 to produce a temperature signal which is representative of the temperature. Responsive to the temperature signal, the automatic expansion valve 19 is automatically driven to adjust the magnitude of the flow of the liquid phase refrigerant component. A combination of the returning pipe 24 and the introducing arrangement is referred to as an original supplying arrangement.

During the evaporation of the cooling refrigerant, the gaseous phase refrigerant component is gradually modified into a modified refrigerant of a liquid phase. Therefore, a combination in the evaporator 18 and the receiving unit 22 may be referred to as a liquefying arrangement.

The modified refrigerant is collected at a lower portion of the hollow space of the receiving unit 22. The storage container 26 is placed under the receiving unit 22 and is connected to the hollow space of the receiving unit 22 through a sending pipe 27. Therefore, the modified refrigerant flows down from the receiving unit 22 towards the storage container 26 through the sending pipe 27, by gravitational force thereof. As a result, the modified refrigerant is charged into the storage container 26. It is a matter of course that the modified refrigerant has a relatively higher purity in the storage container 26.

When the inner pressure of the storage container 26 has inner pressure Which becomes higher than the pressure in the holloW space of the receiving unit 22, the modified refrigerant is prevented from charging towards the storage container 26.

For controlling the inner pressure of the storage container 26, a communication pipe 31 is connected between returning pipe 24 and an upper portion of the storage container 26, to communicate the returning pipe 24 with an inner space of the storage container 26 The communication pipe 31 has, as a part thereof, a regulating element 32 such as a capillary tube which is well known in the art. Therefore, it is possible to cause movement of the modified refrigerant in the gaseous phase from the storage container 26 towards the returning pipe 24 through the communication pipe 31, to control the inner pressure of the storage container 26.

The refrigerant charging system further comprises a condition detecting unit 33 and an electromagnetic valve 34 which will be presently described.

The condition detecting unit 33 is coupled to the returning pipe 24 at an inlet side of the compressor 13, and is for detecting the pressure of the original refrigerant and producing a condition signal which is representative of the pressure. The condition signal is sent from the condition detecting unit 33 to electromagnetic valve 34. The electromagnetic valve 34 is coupled to the communication pipe 31. Responsive to the condition signal, the electromagnetic valve 34 is automatically driven to adjust the movement of the modified refrigerant through the communication pipe 31. A combination of the communication pipe 31, the condition detecting unit 33, and the electromagnetic valve 34 is referred to as a control arrangement.

When the modified refrigerant stored in the receiving unit 22 exceeds a predetermined amount, effectiveness of the heat exchange is suddenly decreased in the liquefying arrangement. In this condition, the cooling refrigerant has a part which flows into the returning pipe 24 without being evaporated in the evaporator 18. As a result, the temperature of the returning pipe 24 is lowered because part of the cooling refrigerant is evaporated in the returning pipe 24 at the vicinity of the liquefying arrangement.

When the temperature is lowered, the automatic expansion valve 19 is driven in response to the temperature signal to decrease the flow of the cooling refrigerant. This results in lowering the suction pressure of the compressor 13.

When the suction pressure is lower than a first predetermined level, the electromagnetic valve 34 is driven in response to the condition signal from the detecting unit 33 to open the communication pipe 31. As a result, the inner pressure of the storage container 26 is lowered, so that the modified refrigerant smoothly flows from the receiving unit 22 and into the storage container 26. This action causes the amount of the modified refrigerant in the receiving unit 22 to become lower than the predetermined amount for the receiving unit 22.

As the amount of modified refrigerant in the receiving unit 22 reduces, the effectiveness of the heat exchange is increased in the liquefying arrangement. In this condition, all of the cooling refrigerant is evaporated in the evaporator 18. As a result, the temperature of the returning pipe 24 rises to return back to an original temperature.

When the temperature of the returning pipe 24 is equal to the original temperature, the automatic expansion valve 19 is driven in response to the temperature signal to increase the flow of the cooling refrigerant. This results in raising the suction pressure of the compressor 13.

When the suction pressure is higher than a second predetermined level which is higher than the first predetermined level, the electromagnetic valve 34 is driven in response to the condition signal to close the communication pipe 31.

Therefore, the object refrigerant can be smoothly charged into the storage container 26 by a repeat of operation of that which is described above.

Figure 2:
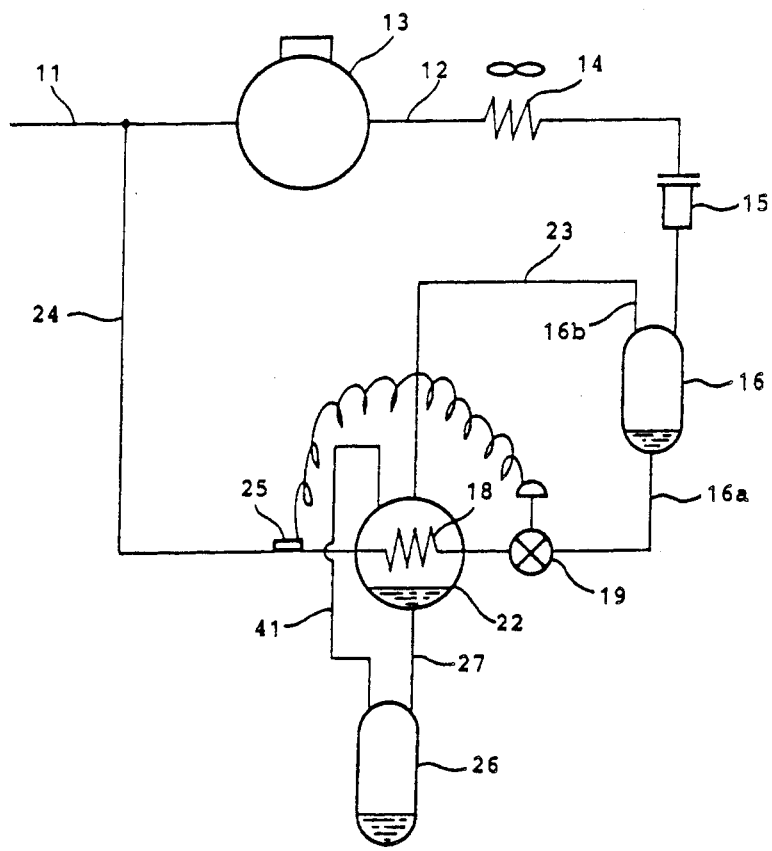
FIG. 2 is a block diagram of a refrigerant charging system according to a second embodiment of this inVention.

Referring to FIG. 2, description will be made about a refrigerant charging system according to a second embodiment of this invention. The refrigerant charging system cOmprises similar parts designated by the same reference numerals used in FIG. 1.

The refrigerant charging system comprises a communication pipe 41 for communicating an inner space of the storage container 26 with the hollow space of the receiving u it 22. The communication pipe 41 has first and second ends which are connected between an upper portion of the receiving unit 22 and an upper portion of the storage container 26, respectively.

When the modified refrigerant is typically supplied to the storage container 26, that the inner pressure of the storage container 26 becomes higher as the volume of the modified refrigerant in the storage container 26 increases. However, the inner pressure of the storage container 26 in this embodiment is usually held to be substantially constant, because the inner pressure is leaked from the storage container 26 to the receiving unit 22 through the communication pipe 41. Therefore, the modified refrigerant can be smoothly charged into the storage container 26.

With this refrigerant charging system, it is unnecessary to provide the condition detecting unit and the electromagnetic valve which are depicted at numerals 33 and 34 in FIG. 1.

While the present invention has thus far been described in connection with two embodiments thereof, it will be possible for those skilled in the art to readily put this invention into practice in various other manners. For example, the regulating element 32 may be a conventional expansion valve.

What is claimed is:

1. A refrigerant charging system for use in charging an object refrigerant which is produced from an original refrigerant into a storage container, said refrigerant charging system including receiving means for receiving said object refrigerant, cooling means coupled to said receiving means for cooling said object refrigerant to produce a modified refrigerant through the use of a cooling refrigerant, and sending means for sending said modified refrigerant to said storage container as said object refrigerant, wherein the improvement comprises:
    processing means for processing said original refrigerant to produce a gaseous phase refrigerant segment and a liquid phase refrigerant segment;
    first supplying means coupled to said processing means and said receiving means for supplying said gaseous phase refrigerant segment to said receiving means as said object refrigerant;
    second supplying means coupled to said processing means and said cooling means for supplying said liquid phase refrigerant segment to said cooling means as said cooling refrigerant; and
    controlling means coupled to said storage container for controlling the inner pressure of said storage container to facilitate charging of said modified refrigerant to said storage container.

2. A refrigerant charging system as claimed in claim 1, further comprising original supplying means coupled to said processing means for supplying said original refrigerant to said processing means.

3. A refrigerant charging system as claimed in claim 2, wherein said controlling means comprises communication means coupled to said storage container and said original supplying means for communicating an inner space of said storage container with said original supplying means.

4. A refrigerant charging system as claimed in claim 3, wherein said controlling means further comprises:
    detecting means coupled to said original supplying means for detecting a condition of said original refrigerant to produce a condition signal; and
    adjusting means coupled to said detecting means and said communicating means and responsive to said condition signal for adjusting said communication means.

5. A refrigerant charging system as claimed in claim 3, wherein said original supplying means comprises returning means coupled to said cooling means and said processing means for returning said cooling refrigerant from said cooling means to said processing means, wherein said communication means is coupled to said returning means for communicating said inner space of the storage container with said returning means.

6. A refrigerant charging system as claimed in claim 3, wherein said communication means comprises:
    a communication path coupled to said inner space of the storage container and said original supplying means; and
    regulating means coupled to said communication path for regulating said communication path.

7. A refrigerant charging system as claimed in claim 5, wherein said original supplying means further comprises introducing means coupled to said returning means for introducing said original refrigerant into said returning means.

8. A refrigerant charging system as claimed in claim 5, wherein said receiving means defines a hollow space, said cooling means comprises an evaporator thermally coupled to said hallow space for causing evaporation of said cooling refrigerant therein, and wherein said refrigerant charging system further comprises:
    temperature detecting means thermally coupled to said returning means for detecting the temperature of said cooling refrigerant to produce a temperature signal; and
    means coupled to said second supplying means and responsive to said temperature signal for adjusting the flow of said liquid phase refrigerant component.

9. A refrigerant charging system as claimed in claim 1, wherein said receiving means defines a hollow space which is thermally coupled to said cooling means, and wherein said controlling means comprises communication means coupled to said storage container and said receiving means for communicating an inner space of said storage container with said hollow space.

10. A refrigerant charging system as claimed in claim 9, further comprising returning means coupled to said cooling means and said processing means for returning said cooling refrigerant from said cooling means to said processing means, wherein said refrigerant charging system further comprises:
    temperature detecting means thermally coupled to said returning means for detecting the temperature of said cooling refrigerant to produce a temperature signal; and
    means coupled to said second supplying means and responsive to said temperature signal for adjusting the flow of said liquid refrigerant.

* * * * *